United States Patent [19]

McGinniss

[11] 3,878,075

[45] Apr. 15, 1975

[54] PHOTOPOLYMERIZATION OF PIGMENTED BINDERS USING COMBINATIONS OF ORGANIC CARBONYLS AND HALOGENATED NAPHTHALENES

[75] Inventor: Vincent Daniel McGinniss, Middleburgh Heights, Ohio

[73] Assignee: SCM Corporation, Cleveland, Ohio

[22] Filed: July 3, 1974

[21] Appl. No.: 485,594

Related U.S. Application Data

[62] Division of Ser. No. 346,350, March 30, 1973.

[52] U.S. Cl. ............ 204/159.23; 96/86 P; 96/115 P; 96/115 R; 204/159.11; 204/159.14; 204/159.19; 260/42.17; 260/42.18; 260/42.22; 260/89.5 A
[51] Int. Cl. ............................ C08f 1/20; C08f 1/56
[58] Field of Search ................. 204/159.23, 159.24; 96/115 P, 115 R

[56] References Cited
UNITED STATES PATENTS

| | | | |
|---|---|---|---|
| 3,326,710 | 6/1967 | Brodie | 204/159.23 |
| 3,661,588 | 5/1972 | Chang | 96/86 P |
| 3,673,140 | 6/1972 | Ackerman et al. | 204/159.19 |
| 3,759,807 | 9/1973 | Osborn et al. | 204/159.23 |

*Primary Examiner*—Murray Tillman
*Assistant Examiner*—Thurman Kennis Page
*Attorney, Agent, or Firm*—Thomas M. Schmitz

[57] ABSTRACT

An improved process for laser or UV curing of pigmented-binder systems comprising ethylenically unsaturated polymers containing at least about 0.05 weight parts of opacifying pigment per weight part of binder wherein the pigmented-binder system includes from about 0.5% up to about 3% of a halogenated derivative of naphthalene in combination with about 0.1 to 2% aromatic amino carbonyl photosensitizers and from about 0.5% to 2% aromatic ketone or aldehyde photosensitizers. The sensitized binder system is a substantially improved system suitable for curing by ultraviolet or laser energy sources.

4 Claims, No Drawings

PHOTOPOLYMERIZATION OF PIGMENTED BINDERS USING COMBINATIONS OF ORGANIC CARBONYLS AND HALOGENATED NAPHTHALENES

This is a division, of application Ser. No. 346,350, filed Mar. 30, 1973.

BACKGROUND OF THE INVENTION

This invention pertains to an improvement in a process for curing ethylenically unsaturated vehicles used as binders for pigments and fillers in surface coatings, and particularly to curing such coatings with ultraviolet or laser radiation until the paint coating is hard and tack free.

It is well known that conventional convection ovens or infrared ovens or other heat sources may be used to heat cure or polymerize various polymeric binders used in surface paint coatings and usually the curing is promoted by a catalyst provided in the coating system. More recently, however, a broad spectrum of ultraviolet wave energy curing has been suggested for polymerizing binders wherein suitable ultraviolet sensitizers are incorporated in the coating system for initiating polymerization of the binder. The UV sources ordinarily produce wavelengths in the UV spectrum that are transmittable through a quartz and generally provide useful wavelengths between about 1600 Angstroms and about 4000 Angstroms. Typical UV emittors include various electric arc lamps, the plasma arc torch described in U.S. Pat. No. 3,364,387, and lasers having a lasing output in the UV spectrum range such as disclosed in U.S. Ser. No. 189,254. The subject matter of the foregoing references are incorporated herein by reference.

Although many prior art processes disclose desirable UV and laser curing of various polymers, the UV and laser curing processes are hindered by the pigments and fillers incorporated into opacifying paint systems. Pigments, fillers and other inorganics very often absorb the wavelengths of the UV or laser source whereby the curing process is hindered. Accordingly, various promoters have been suggested for promoting UV and laser curing of ethylenically unsaturated polymers to promote crosslinking thereof. In U.S. Pat. No. 3,673,140, issued to Ackerman et al., light sensitizers are disclosed for printing ink polymers wherein the preferred sensitizers are stated to be acetophenone, benzophenone, Michler's Ketone, and mixtures thereof, and said patent is incorporated herein by reference. Although such light sensitizers are satisfactory, the speed of cure is inhibited considerably by measurable amounts of pigments, fillers, tincture pigments and like inorganics which are very often incorporated into opacified paint films.

It now has been found that UV and laser curing of ethylenically unsaturated binders is substantially improved by the inclusion of halogenated derivatives of naphthalene such as α-chloromethyl naphthalene, naphthalene sulfonyl chloride and the like into an opacified paint system.

Accordingly, the primary advantages and objectives of this invention include the economical and efficient utilization of UV and laser energy to cure the thermosetting ethylenically unsaturated binders containing fillers and pigments. A further advantage is that substantially improved room temperature curing with UV and laser sources result. Other advantages include suppressing volatization of solvents; improving the color and avoiding degradation of the paint film; avoiding shrinking and distortion of the paint film; and avoiding degradation of substrates such as plastic, paper, or fabric. Room temperature UV and laser curing is rapidly promoted and highly efficient even though the film is fairly thick, highly pigmented and/or heavily filled with inerts. These and other advantages of this invention will become more apparent from the detailed description of the invention.

SUMMARY OF THE INVENTION

Briefly, a photopolymerization process is provided for curing ethylenically unsaturated binders containing from about 5 to 200 weight parts of opacifying pigment per 100 weight parts of binder, wherein the pigmented-binder system includes at least about 0.5% by weight of a halogenated derivative of naphthalene in combination with 0.1 to 2% by weight of aromatic amino carbonyl photosensitizer and about 0.5% to 2% aromatic ketone or aldehyde sensitizer, based on the pigmented-binder system, to efficiently promote a UV or laser cure of the binder.

DETAILED DESCRIPTION OF THE INVENTION

The process of this invention is directed to UV or laser curing of ethylenically unsaturated binders filled with pigments, fillers, and other inorganics to provide a hard and tack-free opacified paint film. The pigmented-binder systems include a synergistic promoter of a halogen derivative of naphthalene in combination with aromatic carbonyl photosensitizer and aromatic ketones or aldehyde photosensitizer. The synergistic sensitizer of this invention substantially improves a complete room temperature cure of an ethylenically unsaturated polymer containing inorganics.

The snyergistic sensitizer is a halogenated derivative of naphthalene having at least one halogen attached to the α-atom attached to the naphthalene ring and generally represented by the following structural formula:

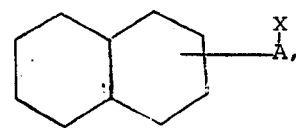

wherein A is either an alkyl radical having 1 to 8 carbon atoms, or a methylene phenyl group

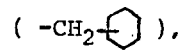

or á sulfonyl radical (—SO₂); and X is a halogen being chlorine or bromine.

Preferred halogenated derivatives of naphthalene include for example: 1-(chloromethyl)-naphthalene represented by the formula

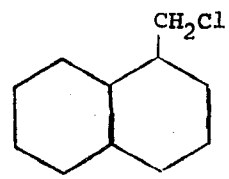

or 1,5 di-(chloromethyl)-naphthalene represented by the formula

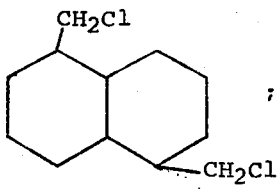

or 2-naphthalene sulfonyl chloride represented by the formula

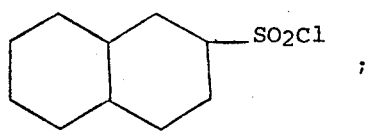

or naphthalene-1,5-disulfonyl chloride represented by the formula

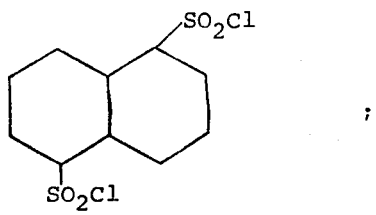

or 1-(chloroethyl)-naphthalene represented by the formula

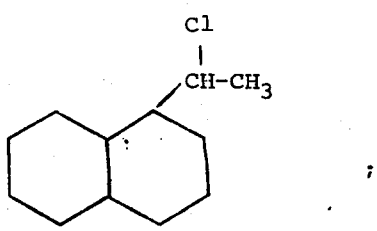

or 1-(chlorohexyl)-naphthalene represented by the formula

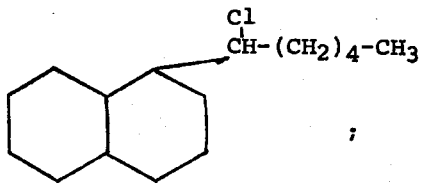

or 1-(bromohexyl)-naphthalene represented by the formula

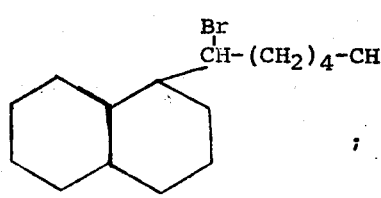

or 1-(bromomethylene-phenyl)-naphthalene represented by the formula

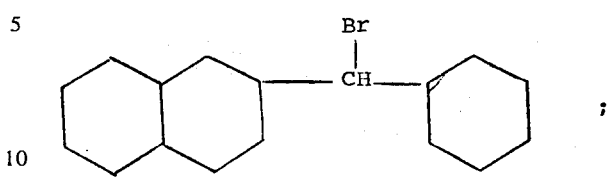

or 1-(bromomethyl)-naphthalene represented by the formula

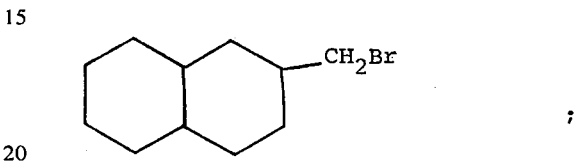

or like halogenated derivatives of naphthalene. The halogenated derivatives of naphthalene are utilized in this invention preferably in quantities of at least from about 0.5% to about 3% by weight based on the pigmented-binder system comprising ethylenically unsaturated binder, pigments, fillers and like inert materials.

Halogenated derivatives of naphthalene may be produced by reacting 1-naphthaldehyde or 2-naphthaldehyde with an alkyl or phenyl Grignard reagent in a standard Grignard reaction to produce an alcohol group on the α-carbon to the naphthalene which is then reacted with $PCl_5$ at room temperature to produce a chlorinated derivative of naphthalene. Chloromethylated derivatives of naphthalene may be produced by known synthesis methods such as described in Chapter 3 of "Organic Reactions," Vol. 1, John Wiley & Sons (8th printing, 1960). Sulfonyl chloride derivatives of naphthalene may be produced by known synthesis methods such as described on page 693 et seq. of "Organic Synthesis," Collective Vol. 4, John Wiley & Sons (2nd printing, 1967).

The halogenated derivatives of naphthalene become synergized when used in combination with aromatic carbonyl photosensitizers such as phenyl carbonyl compounds and aromatic amine carbonyl compounds and sometimes referred to in the art as Michler's Ketones. Examples of aromatic amino photosensitizers include: Michler's Ketone [4,4' bis-(dimethylamino)-benzophenone]; 4,4' bis-(dimethylamino)-benzophenone; p-dimethylaminobenzaldehyde; 4,4 bis-(dimethylamino)-benzil; p-dimethylaminobenzophenone; p-dimethylaminobenzoin; p-dimethylaminobenzil; N-substituted 9-acridanones; and those amino-aromatic (or phenyl) carbonyl compounds described in U.S. Pat. No. 3,661,588; and p-aminophenyl carbonyl compounds described in U.S. Pat. No. 3,552,973 and said patents are incorporated herein by reference. Aromatic amine carbonyl photosensitizers are preferably added to the pigmented binders in amounts of 0.1 to 2% by weight based on the pigmented-binder system.

The synergistic sensitizer of halogenated derivative of naphthalene is further utilized in combination with aromatic ketone or aldehyde sensitizers. Typical aromatic ketones and aldehydes include, for example: acetophenone; propiophenone; xanthone; benzaldehyde;

benzophenone; p-chlorobenzophenone; biacetyl; benzil; fluorenone; 3-nitro-4-chlorobenzophenone 2-carbonic acid; phenanthrenequinone; benzoin and alkyl ethers of benzoin; 2-chlorothioxanthone; 10-thioxanthenone; 1-phenyl 1,2 propanedione oxime and the esters or ethers thereof; isatin; anthrone; hydroxypropylbenzoate; benzoylbenzoate acrylate; 2,4 dimethylbenzophenone; benzoylbiphenyl; acenapthenequinone; dibenzosuberenone-5; and polymers and resins containing phenyl ketone or phenyl aldehydes. Aromatic ketone sensitizers are added to the pigmented-binder system in amounts of about 0.5% to 2% based on the pigmented-binder systems.

Aromatic amino carbonyl photosensitizers may be further derived from aminophenyl ketones or aldehydes contained in polymers or resins. Aromatic amino carbonyl groups may be incorporated into the polymer backbone by including at least about 5% by weight aromatic amino carbonyl group in the polymer. In synthesizing an aromatic amino carbonyl group into a polyester resin, for example, a diol of paramino benzophenone is esterified together with standard glycols and diacids. Similarly, an isocyanate reacted with diol paramino benzaldehyde or paramino benzophenone or the like may be incorporated into the urethane polymer backbone. Useful synergist producing diols may be produced, for example, by reacting active hydrogens on the amine of the amino carbonyl compounds with excess ethylene or propylene oxide to form N-substituted diethanol or dipropanol compounds. Other polymer such as acrylics, epoxies, silicones may be similarly synthesized. The aromatic or aldehyde sensitizers can be similarly incorporated into the polymer backbone. The sensitizer, for example, should contain a hydroxy or carboxy functional group for reacting with conventional reactants to produce polymers containing aromatic ketone or aldehyde sensitizer group in the polymer backbone. About 2 to 10% of polymer having aromatic carbonyl compounds incorporated into the polymeric backbone is ordinarily added to the paint or binder systems whereby about 0.1 to 2.0% aromatic amine sensitizer and/or about 0.5 to 2% aromatic ketone or aldehyde sensitizer is combined with the synergistic halogen derivative of naphthalene.

The polymerizable binders used for this invention are those generally known as ethylenically unsaturated binders which are curable by free-radical induced addition polymerization using peroxy or azo-catalysts for a redox system, to produce a hard, tack-free surface by addition polymerization of ethylenically unsaturated polymers of monomers. Alternatively, the binders can be fluid material wherein the ultraviolet laser causes photochemical generation of a catalytic material or effects a rearrangement which initiates polymerization and that continues until a usefully cured hard surface coating film results. Examples of useful polymerizable binders are polymeric or monomeric materials, or a mixture thereof, especially those exhibiting polymerizable vinyl, acrylic, allylic, mercaptan, fumaric, maleic, or like binders having ethylenically unsaturated functionality. Reactive polymers include unsaturated polyesters, acrylics, epoxies, urethanes, silicones, amine, polyamide resins, and particularly acrylated resins such as acrylated silicone oil, acrylated polyester, acrylated urethanes, acrylated polyamides, acrylated soy bean oil, acrylated epoxy resin and acrylated acrylic resin. Examples of reactive ethylenically unsaturated monomers include a variety of acrylates such as hydroxyethyl acrylate, cyclohexyl acrylate, hydroxypropyl acrylate, hydroxyethyl methacrylate, benzyl acrylate, 2-ethylhexyl acrylate, benzeol, phenyloxyethyl acrylate, lower alkoxy ethoxy acrylate, tetrahydro furfuryl acrylate, n-vinyl pyroladone vinyl acetate, styrene and substituted styrenes. Examples of ethylenically unsaturated binders include oligomers such as trimethylopropane diacrylate and triacrylate, ethylene glycol diacrylate and dimethacrylate, propoxylated bisphenol A diacrylate and dimethacrylate, and 1,6 hexane diol diacrylate pentaerythitol triacrylate.

The ethylenically unsaturated binder is combined with pigments, fillers and inerts to produce an opacified pigmented-binder system. Many useful pigments tend to absorb only minor amounts of energy in the UV range and hence pigments such as zinc oxide may be used quite favorably. Titania, such as anatase and particularly rutile, are particularly desirable in opacified paint coatings but provide opposition to a thorough cure by UV radiation. By utilizing the synergistic sensitizer of this invention, titania opacifying pigmentation may be advantageously used if desired. Other filler materials and coloring pigments include basic lead sulfate, magnesium silicate, silica, clays, wollastinite, talcs, mica, chromates, iron pigments, wood flower, microballoons, hard polymer particles and glass fiber or flake. Generally, it is desirable to use pigments which do not absorb considerable ultraviolet light in the same region of the UV spectrum as is absorbed by the synergistic sensitizer of halogenated derivative of naphthalene.

The pigmented-binder systems may be used for paint films having film thickness of less than 1 mil and preferably about 0.1 to 0.5 mils thick.

The following examples further illustrate this invention but are not to be construed as limiting the scope of this invention. Unless otherwise stated herein all parts indicated are parts by weight and all percentages indicated are weight percentages.

EXAMPLE 1

A diacrylate (DER 332) was produced by reacting two moles of acrylic acid with 1 mole of diglycidyl ether of Bisphenol A with 0.2% benzyl dimethyl amine at 120°C. until the acid number of reactant mixture was essentially zero.

An ethylenically unsaturated binder was produced by mixing at room temperature about 30 parts 2-ethylhexyl acrylate, about 30 parts pentaerythitol triacrylate, and about 30 parts diacrylate.

The foregoing binder was ground with rutile $TiO_2$ to produce a pigmented polymerizable binder having a pigment-binder ration (P/B) of 0.9.

EXAMPLE 2

About 1.5% of Michler's Ketone and about 1.5% α-chloromethyl naphthalene were added to the pigmented binder of Example 1 based on the pigmented binder weight. The sample was drawn down on a steel panel to provide a 0.5 mil paint film and cured under nitrogen blanket on a plasma arc radiation system (PARS) for 0.1 seconds which provided a complete cure. A similar paint film cured by 10 seconds exposure to a conventional UV source with an inert atmosphere. The UV source was two 4000 watt mercury lamps placed 8 inches from the film. The inert atmosphere was created by placing a polyethylene film over the paint before curing to assimilate a nitrogen atmosphere.

EXAMPLE 3

In a manner similar to Example 2, the pigmented binder of Example 1 and containing sensitizers as indicated in the table below were drawn down on a steel panel with a No. 8 WW rod and exposed to a PARS of UV and produces the results indicated.

EXAMPLE 5

The following were added to the pigmented binder composition of Example 1:
 a. 1% acetophenone plus 0.1% Michler's Ketone
 b. 2% acetophenone plus 0.1% Michler's Ketone
 c. 1% acetophenone plus 0.2% Michler's Ketone
 d. 2% acetophenone plus 0.2% Michler's Ketone.

Each of the foregoing compositions (a)–(d) were drawn down on a steel panel with a No. 10 WW rod and

TABLE I

| Sample No. | Sensitizers | Curing Exposure Under Inert Atmosphere | Results |
|---|---|---|---|
| 1 | 1.0% α-chloromethyl naphthalene<br>0.5% Michler's Ketone<br>0.5% acetophenone | 0.15 seconds with PARS<br>8.00 seconds with UV | Fully cured film<br>Fully cured film |
| 2 | 1.0% Michler's Ketone | 0.20 seconds with PARS<br>8.00 seconds with UV | Uncured, wet film<br>Uncured, wet film |
| 3 | 1.5% α-chloromethyl naphthalene<br>0.2% dimethylaminobenzaldehyde<br>0.8% benzil | 0.08 seconds with PARS<br>9.00 seconds with UV | Fully cured film<br>Fully cured film |
| 4 | 2.0% α-chloromethyl naphthalene<br>0.3% Michler's Ketone | 0.1 seconds with PARS | Wet film, uncured |
| 5 | 2.0% α-chloromethyl naphthalene<br>1.0% Michler's Ketone | 0.1 seconds with PARS | Full cure |
| 6 | 2.0% α-chloromethyl naphthalene<br>1.0% acetophenone<br>0.1% Michler's Ketone | 0.07 seconds with PARS | Fully cured film |
| 7 | 2.0% α-chloromethyl naphthalene<br>1.0% acetophenone | 0.10 seconds with PARS | Wet film uncured |
| 8 | 2.0% α-chloromethyl naphthalene<br>2.0% acetophenone | 0.10 seconds with PARS | Wet film uncured |
| 9 | 2.0% α-chloromethyl naphthalene<br>2.0% acetophenone<br>0.1% Michler's Ketone | 0.07 seconds with PARS | Fully cured film |
| 10 | 2.0% α-chloromethyl naphthalene<br>1.5% acetophenone<br>0.2% Michler's Ketone | 0.07 seconds with PARS | Fully cured film |
| 11 | 0.3% Michler's Ketone<br>1.1% phenanthrenequinone | 0.15 seconds with PARS<br>0.07 seconds with PARS | Fully cured film<br>Tacky surface on film |
| 12 | 2.0% α-chloromethyl naphthalene<br>0.3% Michler's Ketone<br>1.1% phenanthrenequinone | 0.07 seconds with PARS | Fully cured film |

EXAMPLE 4

An ethylenically unsaturated binder comprising 30 parts pentaerythitol triacrylate, 30 parts hydroxyethyl acrylate, and 30 parts diacrylate DER 332 was ground with TiO$_2$ to make a pigmented binder having a pigment to binder ratio (P/B) of 0.8 to 1. The pigmented binder was combined with sensitizer combinations noted in the table below, drawn down on a steel panel with a No. 10 WW rod and cured as indicated on a PARS unit.

the film was cured for 0.1 seconds with a PARS unit which produced an undercured film having a tacky surface. Similarly, film samples were cured for 0.07 seconds with a PARS unit which did not cure the film.

EXAMPLE 6

An ethylenically unsaturated binder comprising 30 parts pentaerythitol triacrylate, 30 parts hydroxyethyl acrylate, and 30 parts diacrylate DER 332 was ground with TiO$_2$ to make pigmented binder having a pigment

TABLE II

| Sample No. | Sensitizer Combination | Exposure Time to PARS Inert Atmosphere | Result |
|---|---|---|---|
| 1 | 2.0% benzophenone<br>0.1% Michler's Ketone | 0.05 seconds | Surface cure |
| 2 | 2.0% α-chloromethyl naphthalene<br>2.0% benzophenone<br>0.1% Michler's Ketone | 0.05 seconds | Full cure |
| 3 | 1.0% xanthone<br>0.1% Michler's Ketone | 0.05 seconds | Surface cure |
| 4 | 2.0% α-chloromethyl naphthalene<br>1.0% xanthone<br>0.1% Michler's Ketone | 0.05 seconds | Full cure |
| 5 | 2.0% acetophenone<br>0.2% Michler's Ketone | 0.07 seconds | Surface cure |
| 6 | 2.0% naphthalene sulfonyl chloride<br>2.0% acetophenone<br>0.2% Michler's Ketone | 0.07 seconds | Full cure |
| 7 | 2.0% benzil<br>2.0% Michler's Ketone | 0.10 seconds | Surface cure |
| 8 | 2.0% naphthalene sulfonyl chloride<br>2.0% benzil<br>0.2% Michler's Ketone | 0.05 seconds | Full cure | to binder ration (P/B) or 1 to 1. About 0.3% by weight Michler's Ketone and 2% 1-chloromethyl naphthalene were added to the paint mixture based on the pigment-binder composition. The sensitizer indicated in Table II was produced from the indicated reactants to produce a sensitizer polymer or prepolymer which was added to the pigmented binder in amounts indicated.

The sensitizer polymer or prepolymer was produced by reacting the specified reactant together at about 120°C. to completion. A 0.8 mil paint film was drawn down on a steel panel with a No. 12 WW rod. The film was cured under inert atmosphere for 0.07 seconds on a PARS unit. All of the test samples were fully cured providing hard, tack-free paint coating. Similar samples containing no α-chloromethyl naphthalene took about 0.15 second to cure when exposed to PARS in an inert atmosphere.

Ethylenically unsaturated binders were synthesized in a conventional manner as follows. Siloxane-ester-acrylate resins were produced by reacting a 2 to 8 carbon diol with acrylic or methacrylic acid to give a hydroxyalkyl acrylate which was then reacted with a 4 to 10 carbon dicarboxylic anhydride and a 2 to 21 carbon atom diol. The resulting polyester was then reacted with a siloxane having 2 or more OH and/or alkoxy groups. Similarly, acrylated-amide resins were synthesized by reacting glycidyl acrylate or glycidyl methacrylate reacted with the —COOH group of an acid terminated aliphatic polyamide in a manner described in British Pat. No. 1,241,622. Acrylated-polyester resins were synthesized from a standard polyester such as propylene glycol reacted with excess molar phthalic anhydride to provide an acid terminated polyester which was thereafter reacted with glycidyl acrylate or glycidyl methacrylate. In like manner, acrylated-acrylic resins were produced by reacting a standard acrylic resin containing pendant oxirane functionality with acrylic acid to produce an ethylenically unsaturated resin wherein glycidyl methacrylate, methylmethacrylate and butyl acrylate copolymerized in solution and thereafter reacted with acrylic acid. Similarly, acrylated-urethane resins were synthesized by reacting a diol with a diisocyanate (e.g. TDI) with propyleneglycol to produce an isocyanate terminated urethane resin. The —NCO terminated resin was thereafter reacted with a hydroxyl containing acrylate such as hydroxyethyl acrylate to produce an acrylated urethane resin. Binder compositions synthesized in the foregoing explanatory manner were ground with $TiO_2$ pigment, sensitized with the sensitizer combinations, as indicated in Table IV, drawn down on a steel panel in a 0.7 mil film, exposed to a PARS unit. The results for the identified compositions are set forth in the following Table IV.

TABLE III

| Sample No. | Reactant | Sensitizer |
|---|---|---|
| 1 | 1 mole of 2-benzoylbenzoic acid + 1 mole of propyleneoxide | 2% hydroxypropyl 2-benzoylbenzoate prepolymer |
| 2 | Sample No. 1 + toluenediisocyanote hydroxyethylacrylate adduct | 5% hydroxypropyl 2-benzoylbenzoate contained in a urethane resin |
| 3 | 1 mole of 2-benzoylbenzoic acid + glycidyl acrylate | 2% 2-benzoylbenzoate contained in an acrylate monomer-prepolymer |
| 4 | 1 mole of 2-benzoylbenzoic acid + 1 mole DER 332 | 5% 2-benzoylbenzoate contained in an epoxy resin |
| 5 | 1 mole Sample No. 4 + excess molar acrylic acid | 6% 2-benzoylbenzoate contained in an acrylate unsaturated epoxy resin |
| 6 | 1 mole of phenolic resin + excess molar benzoyl chloride | 5% benzoyl substituted phenolic resin |
| 7 | 1 mole of 3,3', 4,4' benzophenonetetracarboxylic dianhydride + 2 moles hydroxyethyl acrylate + 2 moles of propylene oxide | 5% benzophenonetetracarboxylic dianhydride (BTDA) hydroxyethylacrylate propylene oxide adduct (dihydroxypropyl ester of dihydroxyethylacrylate ester of BTDA) |
| 8 | 2 moles of 5-chloro-2 hydroxy benzophenone + 1 mole of DER 332 | Phenolic benzophenone compound in epoxy resin |
| 9 | 2 moles of 1-Cl-2α bromomethyl benzophenone 2' carboxylic acid + 1 mole of DER 332 | α-haloalkylbenzophenones in epoxy resin |
| 10 | 1 mole of 4-chlorobenzophenone 2-carboxylic acid + 1 mole DER 332 | Benzophenone carboxylic acid derivatives in epoxy resin |
| 11 | 1 mole of 2-hydroxy-4 chlorobenzophenone + 1 mole of ethyleneimine | 3% phenolic benzophenone + ethyleneimine prepolymer |
| 12 | 1 mole of 2,4 dihydroxybenzophenone + 2 moles ethyleneimine | 3% phenolic benzophenone + ethyleneimine |
| 13 | 1 mole of 2,4 dihydroxybenzophenone + 1 mole of butanediol diglycidyl ether + 1 mole acrylic acid | 5% phenolic benzophenone + epoxy resins |
| 14 | 1 mole of 2,4 dihydroxybenzophenone + 2 moles of propylene oxide | 5% phenolic benzophenone + epoxy resin prepolymer |
| 15 | 1 mole of 1-hydroxy xanthine + 1 mole of DER 332 | 5% thioxanthone in epoxy resin |
| 16 | 1 mole aminobenzophenone + excess molar propyleneoxide | 3% dissoprepanolaminebenzophenone |
| 17 | 1 mole methylaminobenzophenone + 1 mole DER 332 | Aminobenzophenone in epoxy resin |

TABLE IV

| Sample No. | Binder Composition | Photosensitizer Combination | Exposure Time to PARS Inert Atmosphere | Result |
|---|---|---|---|---|
| 1 | 1 wt. part hydroxyethyl acrylate, 1 wt. part ethylene glycol diacrylate, 1 wt. part hydroxyethyl acrylate, having a toluene diisocyanate adduct. The pigment-binder ratio (P/B) with $TiO_2$ ground therein was 0.8 | 3.0% 4,4' bis (dimethylamino) benzil; 2.0% benzil | 0.10 seconds | Undercured film |

TABLE IV — Continued

| Sample No. | Binder Composition | Photosensitizer Combination | Exposure Time to PARS Inert Atmosphere | Result |
|---|---|---|---|---|
| 2 | 1 wt. part hydroxyethyl acrylate, 1 wt. part ethylene glycol diacrylate, 1 wt. part hydroxyethyl acrylate, having a toluene diisocyanate adduct. The P/B ratio with TiO₂ was 0.8 | 3.0% 4.4' bis (dimethylamino) benzil; 2.0% benzil; 1.5% 1-(chloromethyl)-naphthalene | 0.10 seconds | Fully cured film |
| 3 | 1 wt. part 2-ethylhexyl acrylate, 1 wt. part propylene glycol diacrylate, 1 wt. part polyester capped with glycidyl acrylate (molecular weight 3,000) ground with TiO₂ to make a P/B of 1.0 | 0.3% Michler's Ketone; 1.0% 2-naphthyl phenyl ketone | 0.07 seconds | Slightly undercured film |
| 4 | 1 wt. part 2-ethylhexyl acrylate, 1 wt. part propylene glycol diacrylate, 1 wt. part polyester capped with glycidyl acrylate (molecular weight 3,000) ground with TiO₂ to make a P/B or 1.0 | 0.3% Michler's Ketone; 1.0% 2-naphthyl phenyl ketone; 2.0% 1,5 di-(chloromethyl)-naphthalene | 0.07 seconds | Fully cured film |
| 5 | 1 wt. part 2-phenoxyethyl acrylate, 1 wt. part pentaerythitol triacrylate, 1 wt. part acrylated silicone resin, ground with TiO₂ to make a P/B ratio of 1.0 | 0.3% Michler's Ketone; 1.0% propiophenone or benzaldehyde | 0.10 seconds | slightly undercured film |
| 6 | 1 wt. part 2-phenoxyethyl acrylate, 1 wt. part pentaerythitol triacrylate, 1 wt. part acrylated silicone resin, ground with TiO₂ to make a P/B ratio of 1.0 | 0.3% Michler's Ketone; 1.0% propiophenone or benzaldehyde; 1.0% 1-(chloromethyl)-naphthalene | 0.07 seconds | Fully cured film |
| 7 | 1 wt. part cyclohexyl acrylate, 1 wt. part 1,6 hexandiol diacrylate, 1 wt. part acrylated soy bean oil, ground with TiO₂ to make a P/B ratio of 0.9 | 0.3% Michler's Ketone; 1.0% benzil, biacetyl, or acenaphthenequinine | 0.10 seconds | Slightly undercured film |
| 8 | 1 wt. part cyclohexyl acrylate, 1 wt. part 1,6 hexanediol diacrylate, 1 wt. part soy bean oil, ground with TiO₂ to make a P/B ratio of 0.9 | 0.3% Michler's Ketone; 1.0% benzil biacetyl, or acenaphthenequinine; 1.0% 2-naphthalene sulfonyl chloride | 0.07 seconds | Fully cured film |
| 9 | 1 wt. part hydroxypropyl methacrylate, 1 wt. part ethylene glycol dimethacrylate 1 wt. part methacrylated polyamide resin, ground with TiO₂ to make a P/B ratio of 0.8 | 0.5% dimethylaminobenzaldehyde, p-dimethylaminobenzil; 2.0% benzil | 0.10 seconds | Slightly undercured film |
| 10 | 1 wt. part hydroxypropyl methacrylate, 1 wt. part ethylene glycol dimethacrylate. 1 wt. part methacrylated polyamide resin, ground with TiO₂ to make a P/B ratio of 0.8 | 0.5% dimethylaminobenzaldehyde, p-dimethylaminobenzophenone; 2.0% naphthalene-1,5-disulfinyl chloride; 2.0% benzil | 0.10 seconds | Fully cured film |
| 11 | 1 part benzil acrylate, 1 part acrylated resin composition, 1 part trimethylol propane triacrylate, ground with TiO₂ to make a P/B ratio of 1.0 | 0.3% Michler's Ketone; 1.0% xanthone, fluorenone, 10-thioxanthenone, or isatin | 0.10 seconds | Slightly undercured film |
| 12 | 1 part benzil acrylate, 1 part acrylated resin composition, 1 part trimethylol propane triacrylate, ground with TiO₂ to make a P/B ratio of 1.0 | 0.3% Michler's Ketone; 1.0% isatin or xanthone, or fluorenone, or thioxanthone; 1.0% 1-(bromomethyl)-naphthalene | 0.07 seconds | Fully cured film |

The foregoing examples are for illustration only and are not intended to be limiting. Variations and modifications are contemplated within the scope of this invention, as defined in the appended claims.

I claim:

1. In a photopolymerization process for ultraviolet curing of a film comprising a pigmented binder system of 1 weight part of an ethylenically unsaturated binder combined with about 0.05 to 2 weight parts of opacifying pigment, and exposing said film to an energy source containing UV energy having wavelengths between about 1600 A and 4000 A until said film is cured, the improvement which comprises:

providing a film of said pigmented binder system containing by weight about 0.5% to 3% halogenated derivative of naphthalene having at least one halogen attached to the alphaatom attached to the naphthalene ring, 0.1% to 2% of an aromatic phenyl ketone, and at least 0.5% of an aromatic photosensitizer selected from the group consisting of aromatic aldehydes and aromatic ketones different than said atomatic phenyl ketone.

2. The process of claim 1 wherein the halogenated derivative of naphthalene is selected from the group consisting of:
1-(chloromethyl)-naphthalene;
1,5-di-(chloromethyl)-naphthalene;
2-naphthalene sulfonyl chloride;
naphthalene-1,5-disulphonyl chloride;
1-(bromomethyl)-naphthalene;
an alpha-chloroalkyl-naphthalene having an alkyl group of 1–6 carbon atoms; and
an alpha-bromoalkyl-naphthalene having an alkyl group of 1–6 carbon atoms.

3. An ultraviolet, photopolymerizable pigmented binder system for use as an opacified film, comprising:
a pigmented binder system comprising opacifying pigment and ethylenically unsaturated binder wherein said pigmented binder system contains about 0.05 to 2 weight parts of opacifying pigment per 1 weight part of said ethylenically unsaturated binder;

said binder system containing by weight about 0.5% to 3% of a halogenated derivative of naphthalene having at least one halogen attached to the alpha-atom attached to the naphthalene ring, 0.1% to 2% of an aromatic phenyl ketone, and at least 0.5% of an aromatic photosensitizer selected from the group consisting of aromatic aldehydes and aromatic ketones different from said aromatic phenyl ketone.

4. The pigmented binder system of claim 3 wherein said halogenated derivative is selected from:

1-(chloromethyl)-naphthalene;
1,5-di-(chloromethyl)-naphthalene;
2-naphthalene sulfonyl chloride;
naphthalene-1,5-disulfonyl chloride;
1-(bromomethyl)-naphthalene;
an alpha-chloroalkyl-naphthalene having an alkyl group of 1–6 carbon atoms; and
an alpha-bromoalkyl-naphthalene having an alkyl group of 1–6 carbon atoms.

* * * * *